United States Patent [19]
Scribner

[11] 3,771,531
[45] Nov. 13, 1973

[54] LEGUME HARVESTER WITH AUTOMATIC DUMP HOPPER

[75] Inventor: Frank F. Scribner, Hoopeston, Ill.

[73] Assignee: FMC Corporation, San Jose, Calif.

[22] Filed: July 17, 1972

[21] Appl. No.: 272,618

[52] U.S. Cl.................. 130/30 H, 56/130, 214/508
[51] Int. Cl....................................................... A01d
[58] Field of Search............... 130/30 R, 30 H, 30 J; 56/10.2, 10.9, 130, 345, 354, 355; 214/508, 518–522

[56] References Cited
UNITED STATES PATENTS

| R25,709 | 1/1965 | Swenson et al. | 214/508 |
| 3,236,035 | 2/1966 | Hamachek et al. | 130/30 H |
| 3,412,883 | 11/1968 | Birdsall | 214/508 |
| 3,678,667 | 7/1972 | Long | 56/130 |

Primary Examiner—Antonio F. Guida
Attorney—F. W. Anderson et al.

[57] ABSTRACT

A field harvester for peas, beans or the like picks up windrows of crops, threshes the crop and delivers the threshed crop to a carriage-mounted tiltable dump hopper. The hopper carriage is advanced to extend over a vehicle along the side of the harvester by a single hydraulic cylinder and the hopper is thereafter tilted by a pair of hydraulic cylinders connected between the carriage and the hopper. An automatic mechanical interlock prevents the hopper from tilting in its carriage until the carriage has been fully extended and prevents retraction of the extended carriage until the previously tilted hopper has been returned to its normal, crop receiving position. The carriage operating and hopper tilting cylinders are connected for operation by a single control valve that applies fluid under pressure to all cylinders simultaneously.

The hopper door is automatically opened when the hopper tilts by linkage connecting between the door and the hopper carriage and the door serves to regulate the rate of discharge flow of shelled crops such as peas, beans or the like because the degree of door opening is proportional to the degree of hopper tilt.

14 Claims, 17 Drawing Figures

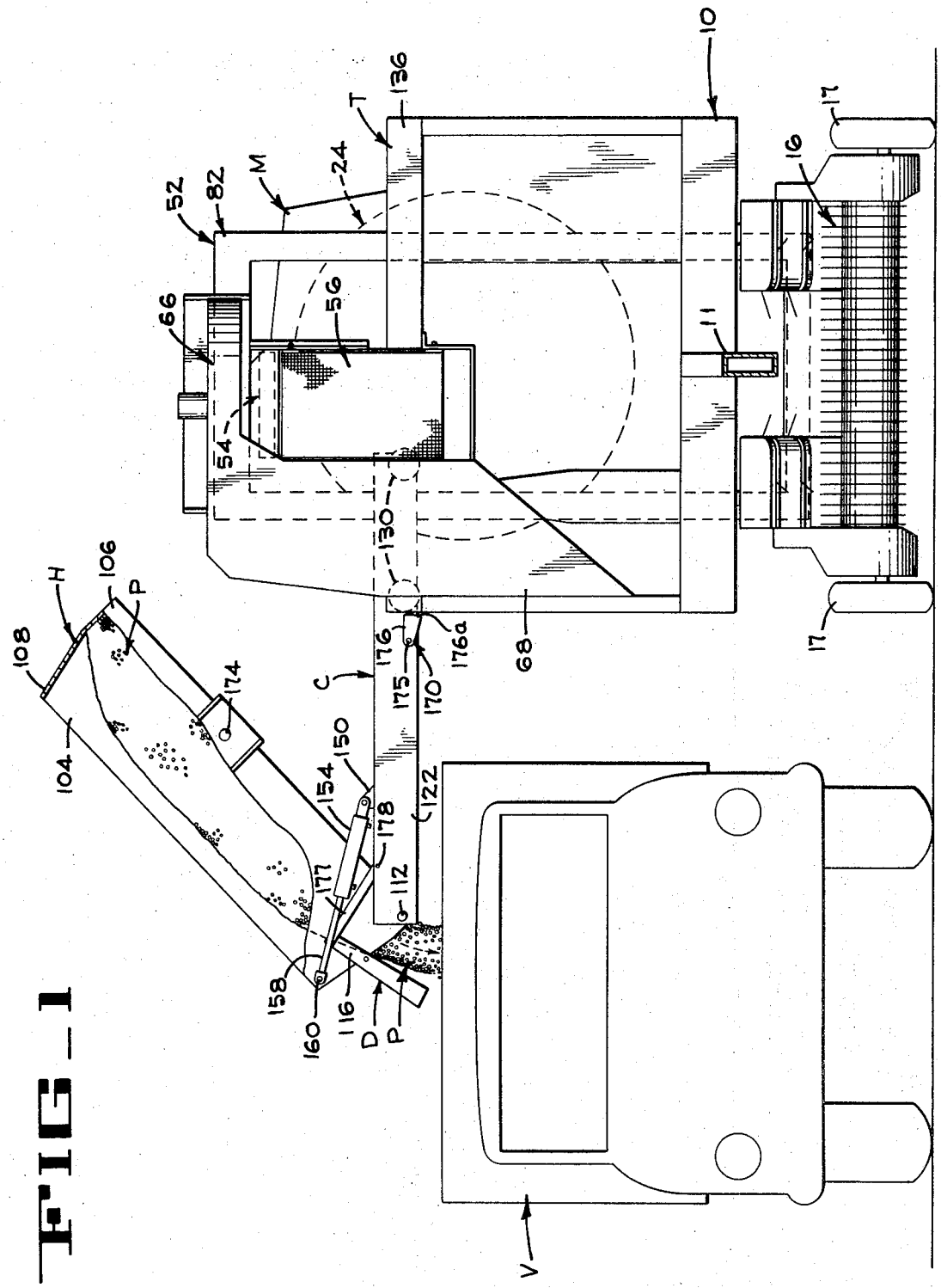

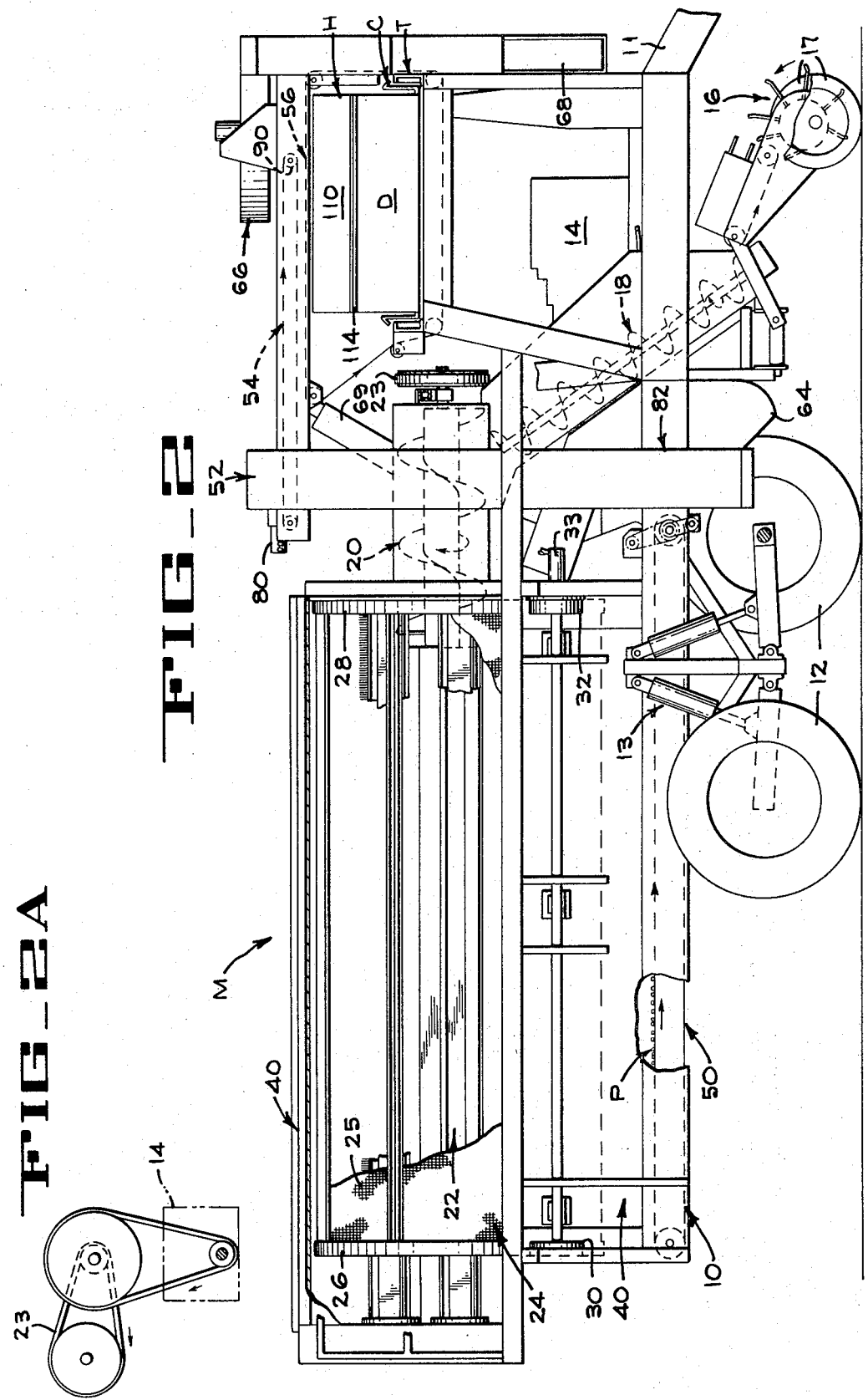

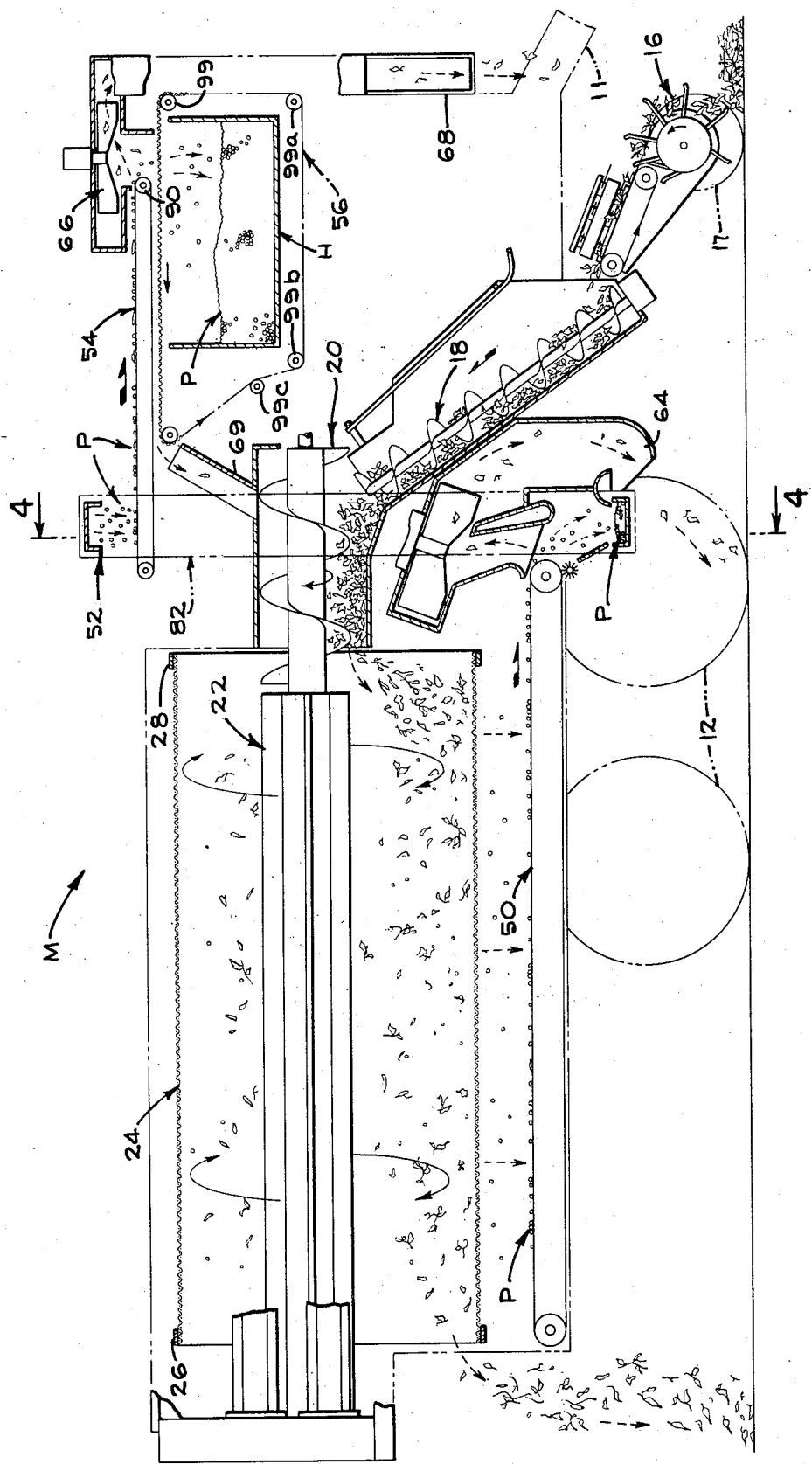

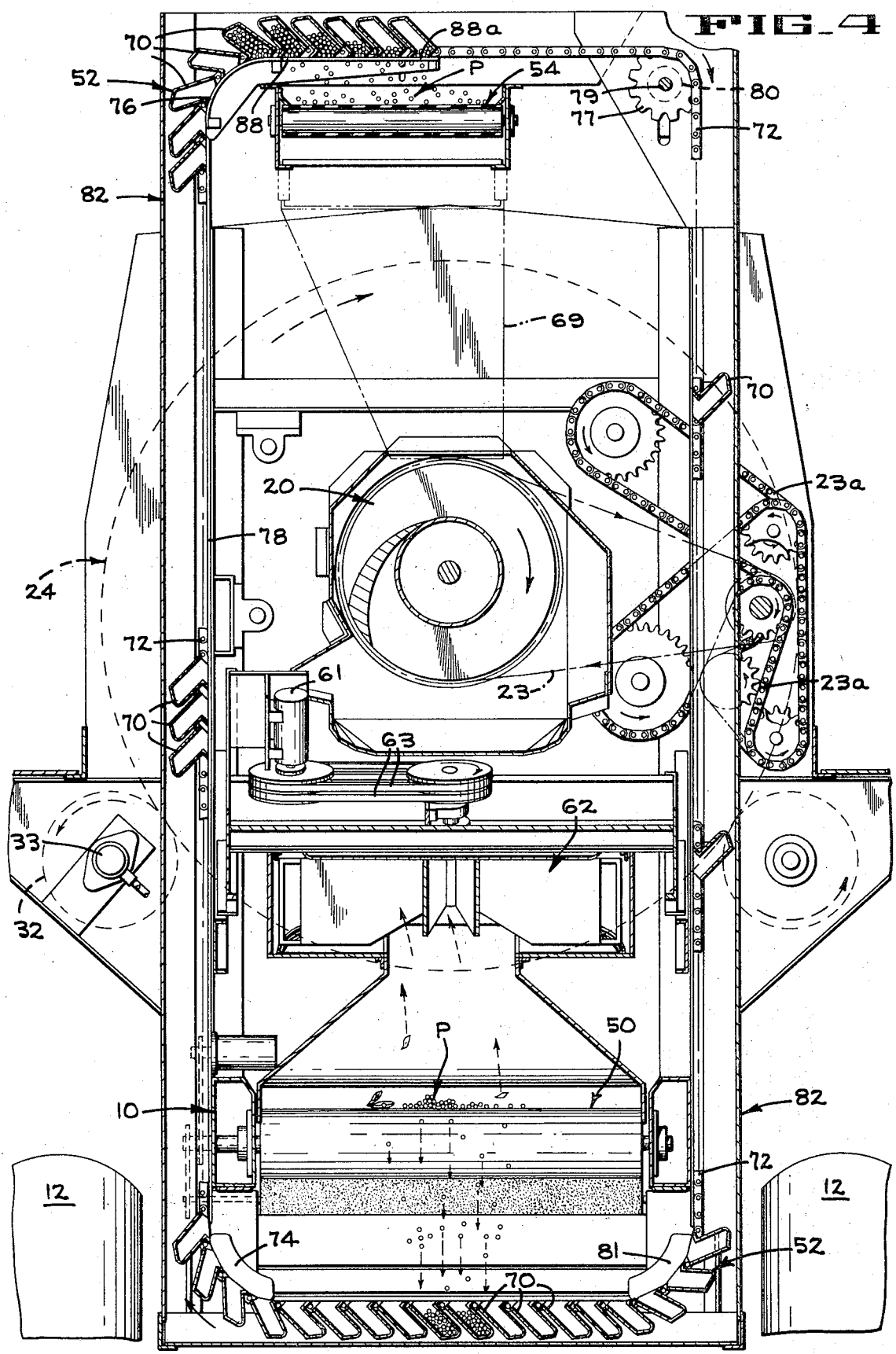

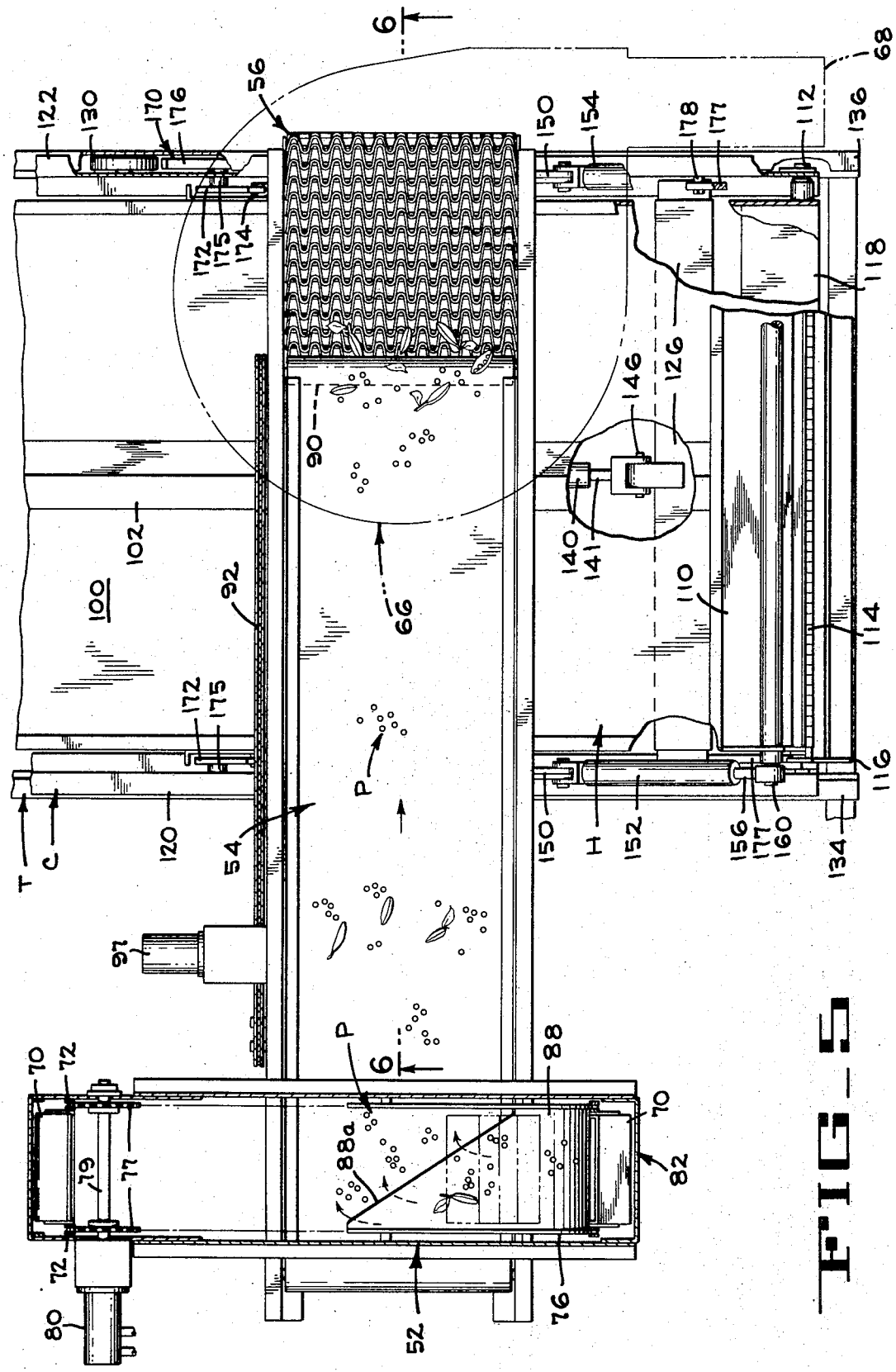

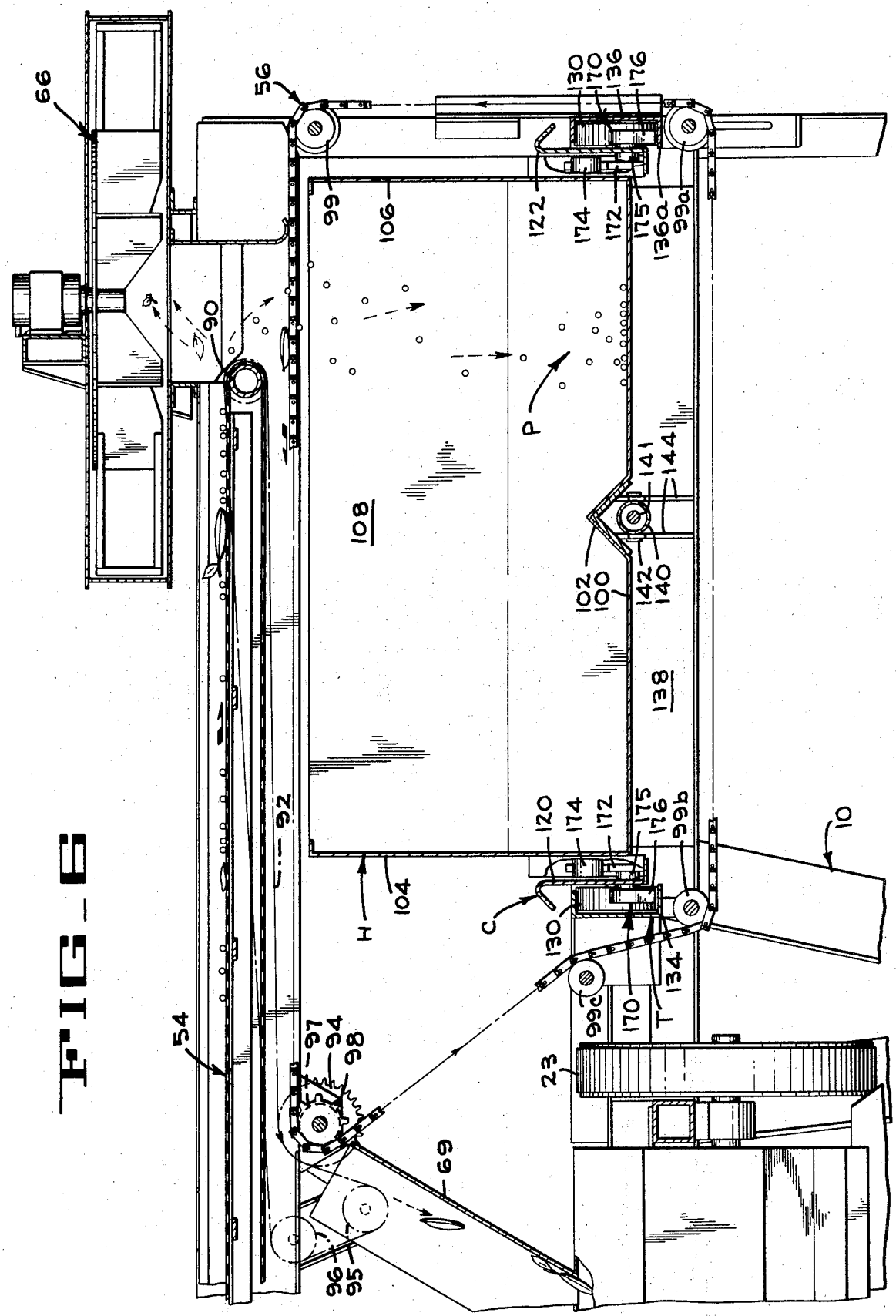

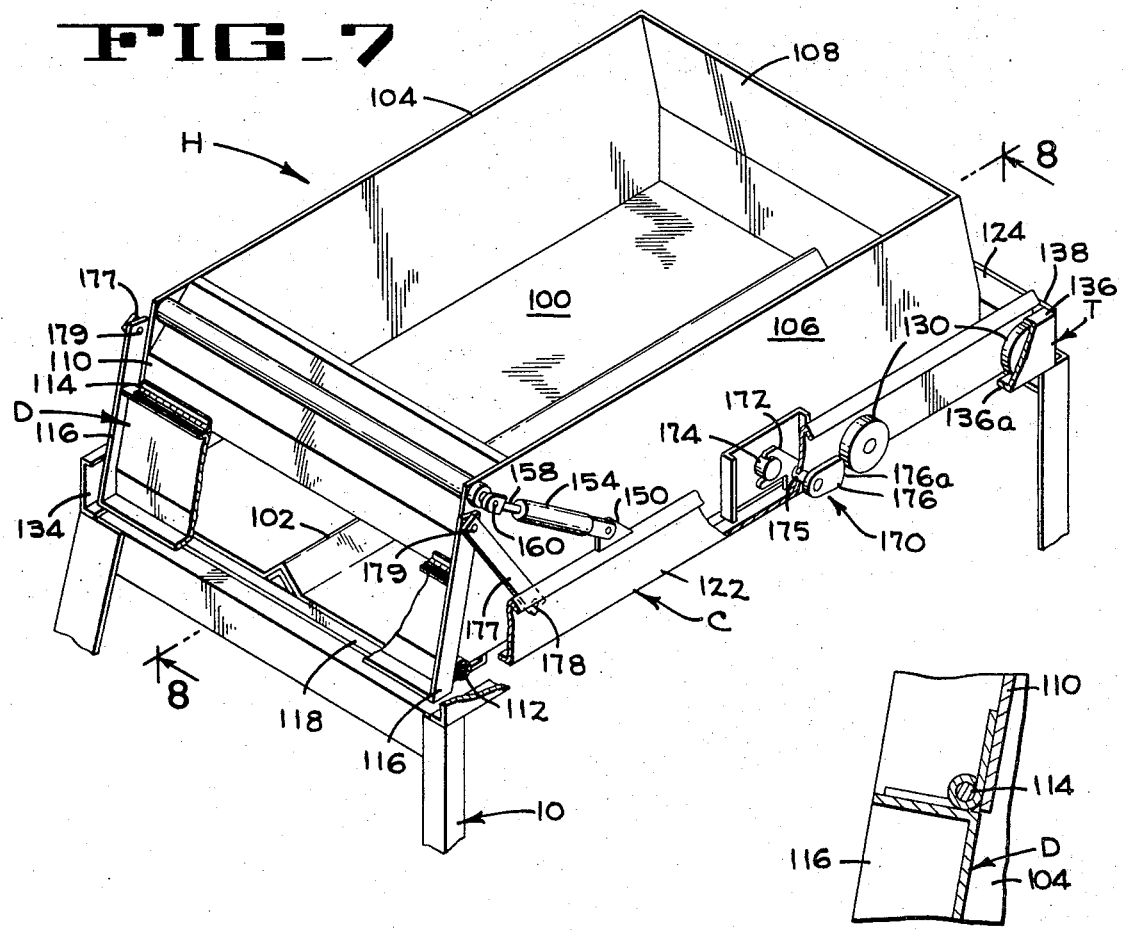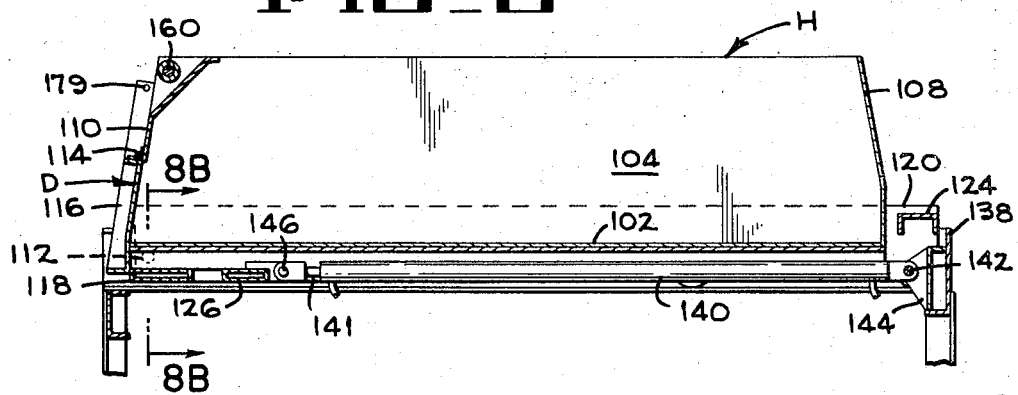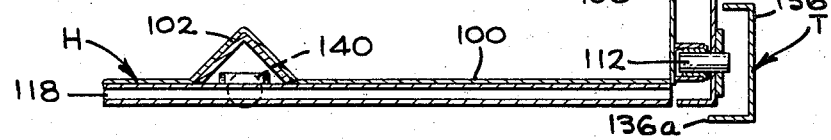

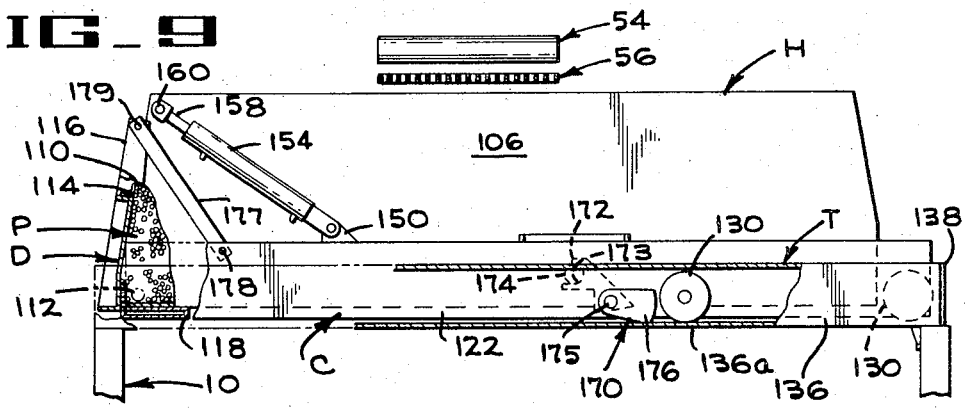
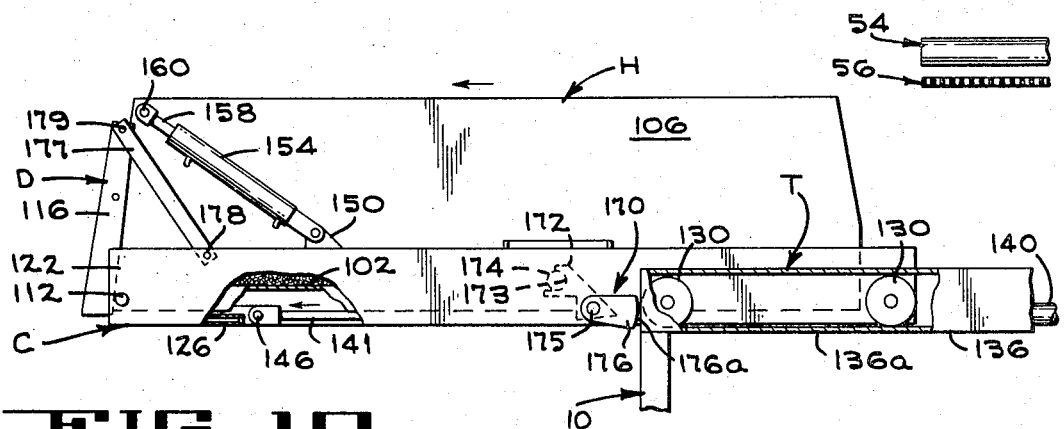
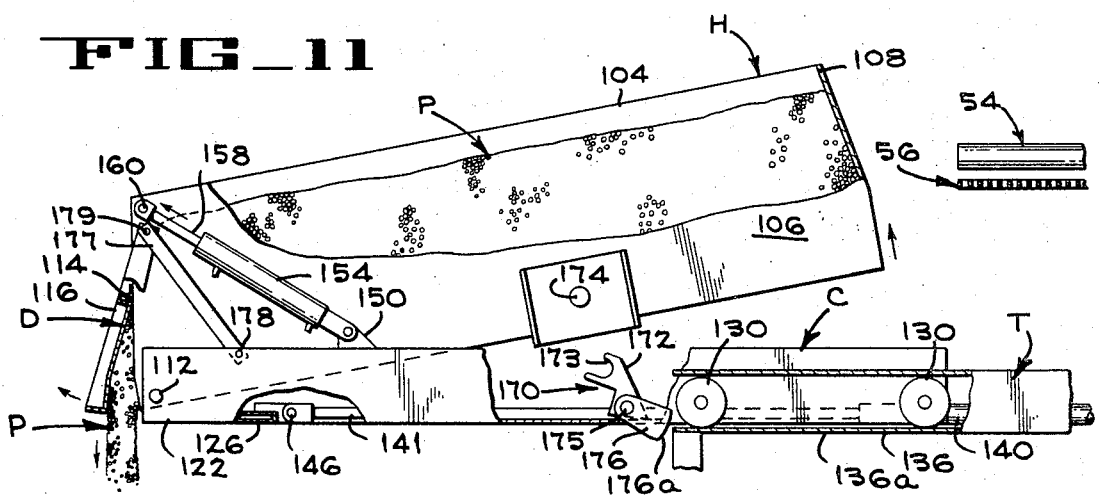

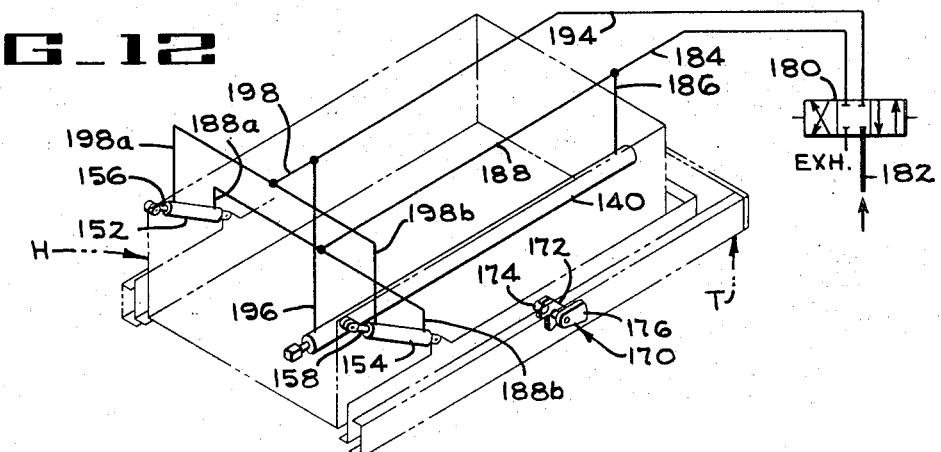
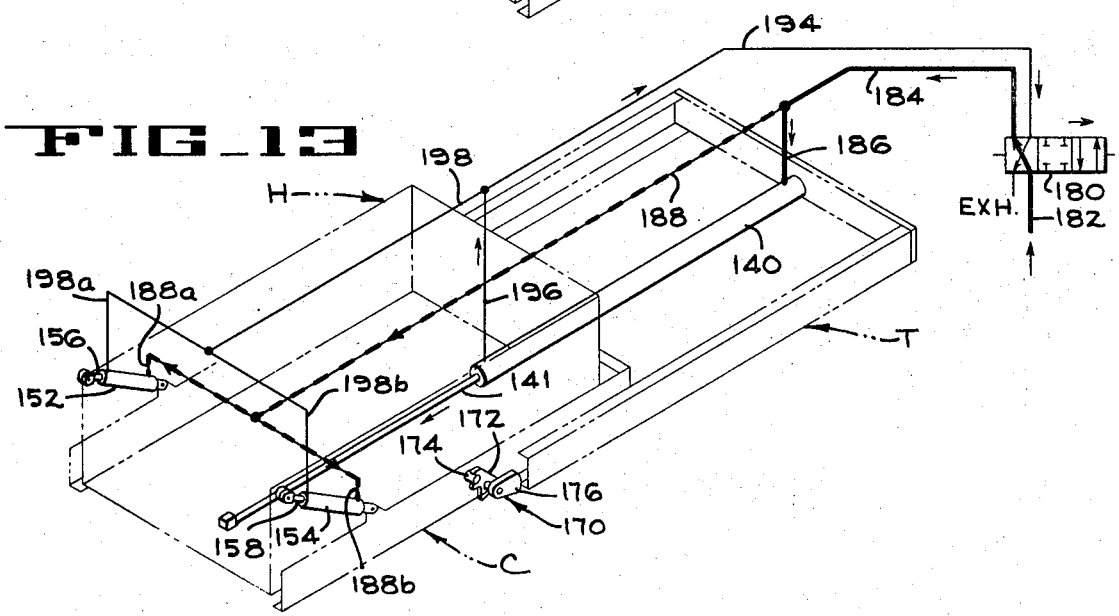
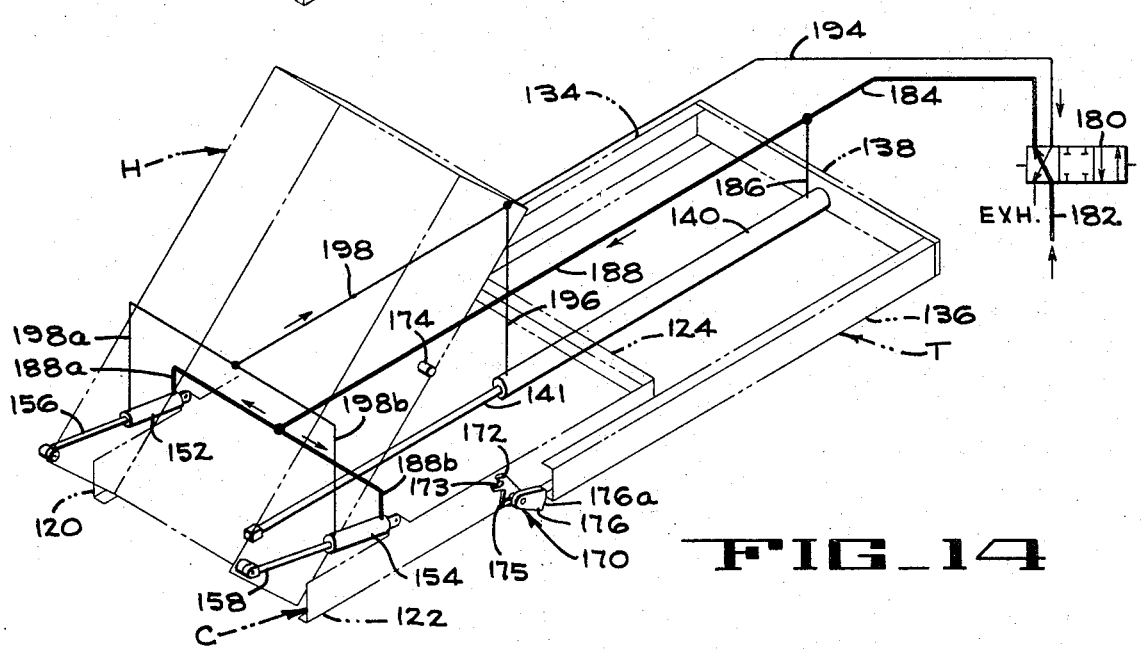

3,771,531

LEGUME HARVESTER WITH AUTOMATIC DUMP HOPPER

REFERENCE TO RELATED APPLICATIONS

The multiple beater threshing assembly referred to herein forms the subject matter of the copending application of Looker et al, Ser. No. 141,900, filed May 10, 1971, now U.S. Pat. No. 3,709,231, issued Jan. 9, 1973, assigned to the FMC Corporation.

An oscillating side panel for the drum screen shroud forms the subject matter of the copending application of Looker et al, Ser. No. 272,617, filed July 17, 1972, assigned to the FMC Corporation (SJ 5329).

The auger feed structure described herein forms the subject matter of the copending application of Burenga, Ser. No. 274,019, filed July 21, 1972, and assigned to the FMC Corporation (SJ 5351).

FIELD OF THE INVENTION

This invention relates to agricultural field harvesters and more particularly to field harvesters for gathering and threshing peas, beans or the like which include an extendable and tiltable hopper for dumping the shelled product into a vehicle that is disposed alongside of the harvester.

DESCRIPTION OF PRIOR ART

The hopper apparatus of the present invention can be considered to be an improvement over the U.S. Pat. to Stark et al No. 3,529,408, Sept. 22, 1970. In the Stark et al dumping system, a hopper is pivotably mounted on a slide or carriage that can be extended and retracted. Both the carriage reciprocation and the tilt of the hopper are effected by a pair of hydraulic cylinders on opposite sides of the hopper which must first extend the carriage until it strikes a stop whereupon further extension of the pair of hydraulic cylinders causes the hopper to tilt. A top pivoted door on the front end of the hopper is opened by a separate hydraulic cylinder for allowing the material in the hopper to flow into a truck or the like alongside the harvester.

The Stark et al patent construction just described has several disadvantages. The construction is not suitable for extra wide hoppers because binding can occur unless the two hydraulic cylinders that both extend the carriage and tilt the hopper are perfectly synchronized. Second, sequential control is required in that the operator must first operate the controls for the cylinders that extend the carriage and tilt the hopper and then operate the controls for the door, requiring some judgment on the part of the operator. Also, there is no assurance in case of binding or the like that the hopper does not begin to tilt before the carriage is fully extended, thereby spilling the crop onto the ground instead of into the awaiting truck or other vehicle. Finally, there is no other means for controlling the rate at which the crop is permitted to flow from the hopper into the vehicle. At times a high flow rate of material such as that usually provided by the Stark et al apparatus might damage the crop.

SUMMARY OF THE INVENTION

The hopper construction of the present invention, although it superficially resembles that of the aforesaid Stark et al patent, has improvements therein which overcome the various disadvantages of that patent outlined above.

In accordance with the present invention, the carriage extension and hopper tilting functions are performed by separate hydraulic cylinder assemblies. Since mere extension of the carriage, which rides rollers in tracks, does not require a large amount of mechanical force, the carriage is extended, under the present invention by a single hydraulic cylinder centralized beneath the hopper. This construction, with a properly and rigidly designed carriage, eliminates the dangers of binding inherent in the previous construction that required synchronism of two cylinders, two cylinders being required to handle the relatively high forces required to both extend and then tilt a filled hopper of considerable width.

Also, in accordance with the present invention, the hopper tilting function is performed by a separate pair of hydraulic cylinders on each side of the hopper. Synchronism of the pair of tilting cylinders is not as critical as synchronism of a pair of cylinders that must reciprocate the carriage, because binding problems do not arise in a simple hopper tilting operation as they do in a carriage and full hopper sliding operation.

Although at first glance it might appear that although the system of the present invention solves binding problems consistent with load handling capabilities, the control of the system, since it has two sets of separate hydraulic cylinders instead of one, would be more complex. However, in accordance with the present invention, both sets of hydraulic cylinders, namely the single carriage extension cylinder and the paired hopper tilting cylinders can be controlled by a single valve because of mechanical interlock means provided. This mechanical interlock means of the present invention prevents the hopper from tilting in its carriage until the carriage is fully extended whereupon the hopper is released for tilting. Thus, by use of a single four-way valve, the operator can direct fluid under pressure to both the single carriage extension cylinder and to the pair of hopper tilting cylinders, but due to the interlock system just referred to, only the carriage extension cylinder will operate initially, tilting of the hopper being prevented by the interlock. If and when the carriage is fully extended in a position for proper dumping to the alongside vehicle, then the tilting interlock mechanism will free the hopper for tilting whereupon the pressure to the hopper tilting cylinders, although previously present, now becomes effective to tilt the hopper.

The automatic door feature of the present invention cooperates with the aforesaid interlock features to simplify the operation. The door of the hopper of the present invention is connected by linkage that extends between the door and the hopper carriage so that as the hopper tilts, the door opens and the degree of door opening is proportional to the degree of hopper tilt. This latter construction has the beneficial effect of regulating and metering the discharge flow of product from the tilted hopper at a rate that is proportional to the hopper tilt. This gives the operator some choice in determining the rate of material discharge so that if large falls of material are encountered as when filling an empty truck, the flow rate could be reduced by simply interrupting the tilting operation before full tilt has been released so that the falling product will not be damaged.

The converse of the mechanical interlock operation also applies under the present invention. Once the hopper has been extended, tilted and emptied, the operator need only move the single control valve to a retract position. The interlock mechanism, however, prevents retraction of the hopper carriage until the tilting cylinders have lowered the hopper to its normal or material receiving position in that carriage. When this occurs, the interlock mechanism frees the hopper carriage for retraction so that the retraction pressure, although previously applied to the retract side of the single carriage operating cylinder, can now and only now become effective to retract the carriage with the hopper in its lowered position.

BRIEF DESCRIPTION OF THE DRAWINGS

FIG. 1 is a front elevation of a harvester embodying the present invention showing the hopper carriage fully extended and the hopper partially tilted for controlled discharge into a truck alongside of the harvester.

FIG. 2 is a side elevation of a harvester embodying the invention, with the hopper carriage retracted.

FIG. 2A is a detail showing the drive to the infeed auger of the harvester.

FIG. 3 is a diagrammatic section like the view of FIG. 1 showing the flow of material through the harvester.

FIG. 4 is a section taken on 4—4 of FIG. 3.

FIG. 5 is an enlarged plan showing the mechanism that delivers crop to the hopper.

FIG. 6 is an enlarged longitudinal section through the hopper mechanism taken along line 6—6 of FIG. 5.

FIG. 7 is a diagrammatic perspective of the hopper mechanism.

FIG. 8 is a longitudinal section through the hopper mechanism taken along line 8—8 of FIG. 7.

FIG. 8A is an enlarged detail showing the door hinge.

FIG. 8B is a section taken along line 8B—8B of FIG. 8.

FIGS. 9, 10 and 11 are operational diagrams of the hopper mechanism.

FIGS. 12–14 are hydraulic diagrams of the hopper mechanism.

GENERAL DESCRIPTION

In the embodiment of the invention to be described, the harvester is of the type that is towed by a tractor or the like but the threshing mechanism, and the various conveyors of the harvester are self-powered. The general arrangement of an operation of a dumping mechanism shown in the present invention is shown in FIG. 1. Here, the harvester, indicated generally at M has stopped momentarily because the hopper H thereof had been filled with peas, beans or the like. The hopper carriage C has been projected or extended in its tracks T, and the hopper H has been tilted. This automatically opens the hopper door D for discharging of the product P into a truck or vehicle V alongside of the harvester. Before describing the hopper mechanism of the present invention in detail and in the interest of completeness, a general description of a harvester embodying the present invention will be presented. Only those details of the frame and chassis structure essential to an underatanding of the general nature of the machine will be explained. A more complete description of the harvester herein illustrated appears in the aforesaid copending application of Looker et al.

HARVESTER DETAILS

Referring to FIGS. 2 and 3, the harvester M has a main frame indicated generally at 10, to which is connected a tow bar 11, shown incompletely. The frame is supported on two pairs of main wheels 12 that embody automatic leveling mechanisms 13 such as that in the aforesaid patent to Carmichael, Jr. et al U.S. Pat. No. 3,033,584. Since the details of the wheel assembly are not critical to the present invention they will not be described.

The various harvester mechanisms to be described are powered by an internal combustion engine 14 for turning the drum screen and beaters. Various hydraulic motor for conveyors are driven from a conventional pump unit (not shown) that is also powered by the engine. The controls (not shown) for the engine and for various hydraulic motors are mounted on the harvester above the tongue 11 and face forwardly for operation by the tractor driver (not shown). This feature is conventional in towed harvesters and since it is not critical to the invention is not illustrated.

The harvester includes a crop pickup indicated generally at 16, supported on wheels 17, and the details of the pickup are not critical to the present invention. The pickup 16 picks up cut vines that have been placed in windrows and directs the vines and attached crop to a twin elevating auger assembly indicated generally at 18 and shown in FIGS. 2 and 3.

The twin auger assembly 18 (only one auger is visible in FIG. 3) delivers the crop to a single infeed auger indicated generally at 20, which auger forms a forward extension of the shaft for the main beater 22 (FIG. 3) of a threshing unit such as that described in the aforesaid Looker et al application, Ser. No. 141,900. In the present embodiment, the auger 20 and the main beater 22 are driven by a belt 23 (FIG. 4) and other beaters (not shown) are driven by chains and sprockets 23a. These drives are not critical to the present invention and are disclosed in detail in the aforesaid Rouse et al application. A large, rotating drum screen indicated generally at 24 surrounds the beaters and forms a major component of the threshing unit of the harvester. In accordance with conventional practice, the drum screen 24 includes a screen proper 25, which may be formed in panels, and has end rings 26, 28 which are supported on rollers 30, 32 on one side (FIG. 2) and by corresponding rollers on the other side. The rollers 30, 32 are driven by a hydraulic motor 33 (FIG. 4) to rotate the drum screen 24, as described in the aforesaid application of Looker et al. The drum screen 24 is surrounded by a shroud (FIG. 4) indicated generally at 40 which has a side panel construction that forms the subject matter of the aforesaid Looker et al application.

As to crop flow, and as seen in FIG. 3, the crop that is elevated by the twin auger assembly 18 and delivered to the interior of the drum screen 24 by the single large infeed auger 20, drops into the screen and is threshed by the beaters inside the screen with the vines being ejected from the rear of the screen. The threshed crop P (e.g., peas or beans) falls through the screen, is confined by the shroud 40 and falls onto a forwardly running crop conveyor 50 (FIGS. 3 and 4). The conveyor 50 delivers the crop to the lower transverse reach of a forwardly disposed endless bucket conveyor 52 that runs transversely around the machine (FIG. 4). The upper transverse reach of the bucket conveyor 52 dumps the crop onto an upper, forwardly running crop delivery conveyor 54 (FIGS. 3, 4 and 5), which delivers the crop to the upper, rearwardly running reach of a mesh type podder conveyor 56, the construction of which is known in the art, and the details of which are not critical to the present invention. The podder conveyor 56, which screens out trash and pods but has a mesh with openings sufficient to drop the peas, beans or the like into the hopper H of the present invention. As mentioned, the hopper H and its carriage C can be shifted laterally on track T (FIG. 1) for dumping into a vehicle V alongside the harvester. These details will be explained presently.

In order to remove trash that works its way through the drum screen 24 and is picked up the the crop conveyor 50 along with the crop itself, two blowers are provided. As seen in FIG. 3, a lower blower 62 draws air up past the delivery end of the crop conveyor 50 and hence removes some of the trash, ejecting it through a discharge duct 64 to the ground. The blower 62 is driven by a hydraulic motor 61 and belts 63 (FIG. 4). Any trash that remains with the crop is carried up by the bucket conveyor 52 and onto the forwardly running delivery conveyor 54. As is also seen in FIG. 3, when the conveyor 54 drops the crop onto the podder conveyor 56, a second blower 66 draws trash up and away from the delivery end of the conveyor 54 and blows it out a forward discharge duct 68. In case unthreshed or crop pods which are not light enough to be blown away by the trash blowers just described remain on the podder conveyor 56, these pods, etc. are delivered by the podder conveyor 56 back into the infeed auger assembly 20 housing, by means of a chute 69 best seen in FIGS. 3 and 6.

Having completed a general description of the harvester and the manner in which crop flows therethrough, the mechanism of the present invention and units associated therewith will now be described in detail.

BUCKET CONVEYOR

As mentioned, the bucket conveyor 53 receives shelled crop from the crop conveyor 50 as seen in FIGS. 3 and 4 and elevates it onto the crop delivery conveyor 54 at the upper front of the harvester. In the embodiment of the invention shown, the bucket conveyor 52 comprises a series of small slanted buckets 70 (FIG. 4) mounted on laterally spaced chains 72, only one of which appears in FIG. 4. The chains 72 are trained around a lower arcuate guide 74, an upper corner guide 76, and along an intermediate vertical wall 78 which closes the buckets, as does the upper guide 76. However, as the buckets 70 pass over the conveyor 54 in their inverted condition, the shelled product P drops between the chains 72 and onto the conveyor 54 for delivery to the dump hopper H (FIG. 3). The bucket conveyor chains 72 are driven by sprockets 77 (FIG. 5) one of which appears in FIG. 4, on a shaft 79 which shaft is driven by a hydraulic motor 80 (FIG. 5). A lower return guide 81 (FIG. 4) is provided. The bucket conveyor 50 is protected by a U-shaped channel housing indicated generally at 82.

Instead of dropping the crop directly onto the crop delivery conveyor 54, the bucket conveyor 52 drops the crop onto a spreader plate 88 (FIG. 5) which forms part of the upper guide 76 and has an inclined drop off edge 88a so that crop is swept off of the inclined edge of the plate 88 onto the delivery conveyor 54. This construction spreads the crop delivered from the bucket conveyor across substantially the full width of the delivery conveyor 54.

The drive for the delivery conveyor 54 is shown in FIG. 6. The front roller 90 of that conveyor is driven by a chain 92 seen in elevation in FIG. 5 and in phantom in FIG. 6 by a sprocket on the shaft for the roller 90. This chain is driven by a sprocket 94 (FIG. 6) and passes over idlers 95, 96. The shaft of the sprocket 94 is driven by a hydraulic motor 97 (FIGS. 5 and 6).

The podder conveyor 56 is driven by the same motor 97 that drives the delivery conveyor 54. As seen in FIG. 5, the podder conveyor is of open mesh construction formed of links and cross bars. The edge portions of this conveyor are designed so that the cross bars mesh with sprockets 98 on the shaft for the aforesaid motor 97 (FIG. 6). These sprockets pull the upper reach of the podder conveyor rearwardly, the conveyor passing over the top of the hopper H and around idlers 99 to 99c, which guide the podder conveyor entirely around the periphery of the hopper.

DUMP HOPPER MECHANISM

Having completed a detailed description of a harvester in general that embodies the present invention and the conveyor system that delivers shelled crop to the dump hopper H, the construction of the hopper and its operating mechanism will now be described in detail.

The hopper H is itself a box-like structure having a bottom wall 100 formed with a longitudinal median channel 102 (FIGS. 6 and 7). The hopper has sidewalls 104, 106, a rear wall 108 (FIGS. 7 and 8) and a front wall 110 that stops short of the bottom wall 100 (FIG. 8), leaving an opening that is closed by the door D. Projecting laterally from each lower front corner of the hopper are pivot pins 112 (FIGS. 8B and 10) which pivotally mount the hopper in the carriage C. The door D is hinged to the front wall 110 of the hopper H by a piano type hinge 114 (FIG. 8A) and each side of the door has upper projecting arms 116 for connection to the door operating linkage in a manner to be described presently.

As seen in FIGS. 7, 8 and 8B a rectangular tubing reinforcing member 118 is welded across the bottom lower edge of the hopper and is flush with the door D when the latter is closed.

As mentioned, the hopper H is pivotably mounted at 112 (FIGS. 7 and 8B) to the channel C and the channel C is reciprocated in track assembly T. The channel C is in the form of a rigid, open box-like structure having Z shaped side channels 120, 122 connected at their rear by a cross channel 124 (FIGS. 8 and 14). Near the front of the carriage C, a rectangular cross tube 126 bridges the side channels of the carriage and is welded thereto to form a box-like carriage structure.

The rear portion of the carriage is provided with two rollers 130 on each of the channels 120, 122 which rollers slide roll snugly in C shaped side channels 134, 136 that form the actual track members of the track T. At the rear of the track T, the side channels 134, 136 are welded to a cross channel 138 (FIGS. 7, 8 and 14).

In order to reciprocate the carriage C and the hopper H pivotally mounted thereon between the loading position of the hopper shown in FIG. 5 and the dump position shown in FIG. 1, a single, centrally located hydraulic cylinder 140 is provided. This cylinder is partially received in the V-shaped groove 102 (FIG. 8B) in the bottom of the hopper H. The cylinder itself is pivoted at 142 (FIG. 8) to brackets 144, secured to the rear cross piece 138 forming part of the track assembly T. The piston rod 141 for the cylinder 140 is pivoted at 146 (FIGS. 5 and 8) to an ear welded to the carriage cross tube 126, previously described. Thus, advance and retraction of the piston rod 141 of the cylinder assembly 140 will extend or project the carriage C and the hopper H from the rearward or loading position of FIG. 5 to the dump position of FIGS. 1 and 11, but will not tilt the hopper or operate the door. Since the mere horizontal reciprocation of the carriage and hopper requires no great degree of force, and since the carriage is supported by the rollers 130 in the track channels 134, 136 a single, centrally located cylinder assembly 140 will advance and retract the hopper and the carriage without binding.

It is a feature of the present invention that the hopper H is tilted in the carriage C by means of a pair of hydraulic cylinders that are separate from the hydraulic cylinder assembly 140 that reciprocates the carriage in its tracks. Thus, as seen in FIGS. 5 and 7 the carriage side channels 120, 122 are provided with upwardly projecting ears 150 that mount cylinders 152 (FIG. 7) and 154 (FIG. 5) of the hopper tilting mechanism. The piston rods 156 (FIG. 7) and 158 (FIG. 5) for the tilting cylinders have their ends pivoted to the opposite ends of a pivot rod 160 secured at the upper front corner of the hopper and extending between the hopper side plates 104, 106.

MECHANICAL LOCKOUT DEVICE

As previously mentioned, a mechanical lockout device is provided which holds down the hopper and hence prevents tilting of the hopper before the hopper carriage has been fully extended, and which locks the carriage against retraction until the tilted hopper has been fully lowered to its normal, crop receiving position. As also previously mentioned, this hold back or lock-out feature makes it possible to cause sequential operation of the carriage reciprocating cylinder 140 and the hopper tilt cylinders 152, 154 by means of a single control valve without requiring sequential operation of that valve.

This lockout mechanism is indicated generally at 170 and is formed with a pivoted lever or fork 172 (FIGS. 7 and 11) the notch 173 of which receives a keeper pin 174 projecting from the hopper. Of course, a companion assembly 170 is provided on the opposite side of the hopper mechanism for that shown in FIGS. 7 and 11. Each lever or fork 172 is integral with a pivot 175 which extends through the side rail 120 of the carriage on one side and the corresponding carriage side rail 122 on the other side of the hopper. Rigid with the fork pivot 175 is a lockout cam 176 which has two functions. As seen in FIG. 9 when the carriage C is retracted, the lockout cam 176 on that side is held up by the lower flange 136a of the track channel 136, and, of course, the same applies to lockout cam for the mechanism 170 on the other side of the hopper adjacent to the channel 134. With this position of the lockout cam 176, the fork 172 is positively maintained in its forward position so that the notch 173 in the fork embraces the associated hopper keeper pin 174, as best seen in FIG. 7. Thus even if fluid under pressure were applied to the hopper tilting cylinders 152, 154, with the carriage in its retracted position these cylinders cannot tilt the hopper out of its normal, crop receiving position in the carriage.

When the carriage is fully advanced as seen in FIG. 10 (which is also the condition illustrated in FIG. 13), the lockout cam 176 is extended past the end of the channel 136 of the track T and the same applies to the cam on the other side of the hopper. Since the cam 176 is now clear of the lower track channel flange 136a, the lockout mechanism can now be rotated about the pivot 175, and hence freely rotated, can no longer restrain the hopper pin 175 and the hopper against tilting.

As seen in FIG. 11, when the carriage is fully extended and the hopper tilted, the lockout cam 176 drops down by force of gravity. Now its curved edge 176a is in front of the outer end of the track channel 136, which prevents retraction of the carriage so long as the hopper H is tilted in the carriage. The same action takes place on the other side of the carriage.

DOOR OPENING MECHANISM

As previously mentioned, the door D is automatically opened proportionately to the amount of tilt of the hopper H in the carriage. In order to provide this automatic motion, duplicate links 177 are connected between the carriage side channels 120, 122 and the extension arms 116 for the door D. Each link is provided to the associated carriage side channel at 178 (FIG. 7) and to the associated door arm 116 at 179. As the hopper H is tilted in the carriage (FIGS. 1 and 11), the links 117, being connected to the carriage and to the door arms 116, restrain the upper end of the door arms from fully partaking of the tilting motion of the hopper. However, since the door D is hinged at 114 to the hopper, the combined action of the links 117 and the hinge mounting of the door results in a progressive opening of the door, this opening being proportional to the degree of hopper tilt. This action causes a progressive increase in the mouth or throat provided between the door and the bottom of the hopper which provides a flow control for the stream of product P falling by gravity from within the hopper.

HYDRAULIC CIRCUIT

FIGS. 12-14 illustrate the illustration of the hydraulic and single control system of the present invention during carriage advance and hopper tilt. A three position, four-way valve 180 of conventional design is under control of the operator at the tractor (not shown) that pulls the harvester. Hydraulic fluid under pressure is supplied to the valve at inlet 182 and the valve is provided with an exhaust line in the conventional manner. A line 184 leads from the valve 180 for advancing the carriage and for tilting the hopper. This line has a branch 186 directed to the rear of the carriage advancing cylinder 140 and a branch 188 with sub-branches 188a, 188b directed to the lower ends of the hopper tilt cylinders 152, 154. A companion line 194 leads from the valve 180 to a branch line 196 connected to the retract end of the carriage cylinder 140. The line 194 also has a line 198 with sub-branches 198a, 198b connected to the upper or hopper lowering ends of the tilt cylinders 152, 154. The lines 194-198 serve as exhaust lines during advance of the carriage and tilting of the hopper and serve as pressure lines during lowering of the hopper and retraction of the carriage. Of course, during the latter operation, the lines 184-188 serve as exhaust lines. FIGS. 13 and 14 illustrate pressure conditions for carriage advance and hopper tilt, the conditions for hopper lowering and carriage retraction not being illustrated.

OPERATION

The over-all operation of a harvester embodying the present invention has been previously described and need not be repeated. Suffice to say at this point, and as illustrated in FIGS. 5 and 6, as the harvester is run down the field, the shelled crop P is delivered by the delivery conveyor 54 to the rearwardly running podder conveyor 56 and the shelled crop (such as peas) is dropped through the podder conveyor into the hopper H. When the hopper has received enough peas (for example) to warrant unloading thereof, the harvester M is stopped and a truck V or the like is brought alongside of the harvester as shown in FIG. 1. The operator on the tractor (not shown) operates the valve 180 (FIG. 12) from the position shown in that figure wherein the hydraulic supply line 182 leading to the valve is blocked to the position of the valve shown in FIG. 13. In this position, fluid under pressure is directed to the main line 184 and hence to the branch line 186 connected to the rear end of the carriage shifting cylinder 140. Until the carriage is fully advanced, and as seen in FIG. 9, the lockout cam 176 on that side will be riding on the flange 136a of the track channel 136 and hence the mechanism 170 will have locked down the hopped. Of course, the same action occurs on the other side.

When the branch line 186 is pressurized as previously described, the hydraulic cylinder 140 begins extending the carriage and hence the hopper. As seen in FIG. 13, pressure is also supplied to the branch lines 188, 188a, 188b leading to the lower ends of the hopper tilt cylinders 152, 154, thus being indicated by heavy dashed lines. However, since the mechanisms 170 on each side of the hopper lock the hopper down against tilting, pressure in these branch lines has no effect, but carriage advance by the cylinder 140 continues.

As mentioned previously, when the carriage is fully advanced as seen in FIG. 10 (which is also the condition illustrated in FIG. 13), the lockout cam 176 is extended past the end of the channel 136 of the track T and the same applies to the cam on the other side of the hopper. Since the cam 176 is now clear of the lower track channel flange 136a, the lockout mechanism can now be rotated about the pivot 175, and hence freely rotated, can no longer restrain the hopper pin 175 and the hopper against tilting.

Hydraulically, the action which now takes place is illustrated in the hydraulic diagram of FIG. 14 and in the mechanical diagram of FIG. 11. As seen in FIG. 14 the pressurized fluid previously present in branch lines 188, 188a and 188b hence which was exerting force on the hydraulic tilt cylinders 152, 154, can now take effect and cause extension of the pistons of these cylinders. This extension, due to the cylinder and piston connections between the carriage and the hopper shown in FIG. 11, causes the hopper H to tilt for dumping the product P from the hopper. The keeper pins 174 on the hopper, which were previously restrained by their associated lockout mechanisms 170, initially pivot these mechanisms out of the way which permits tilt of the hopper as shown in FIG. 11. As mentioned, the lockout cams 176 are now in the lowered, carriage restraining position.

FIG. 1 shows the hopper under full tilt and hence the links 177 have opened the door D fully in the manner previously explained. Thus, the door D cooperating with the leading edge of the bottom wall 100 of the hopper provides a maximum outlet for the product P.

In some cases, as in where the distance of the product fall is great or when the hopper is quite full, it may be desired to restrict the rate of flow from the hopper. Under these circumstances the operator, while manipulating the valve 180 and while observing the hopper, will shift the valve from the active position of FIGS. 13 and 14 back to the inactive position of FIG. 12 when the hopper has reached a degree of tilt such as to produce the desired rate of flow from the hopper. Such a reduced tilt condition is shown in FIG. 11 and here it can be seen that when the hopper is not tilted fully as in the case of FIG. 1, the door D has not been fully opened by the links 177. Thus, the door D cooperating with the hopper bottom wall 100 provides a reduced size outlet throat or channel for delivery of product P by gravity from the hopper into the vehicle below. It is to be noted that when the hopper is full, even when it is partially tilted there may be a body of crop resting against the front hopper wall 110 and the door D, so that if the door were fully opened a large blow stream of crop would initially take place.

In some cases it may be desired to begin dumping of the hopper with a reduced degree of tilt shown in FIG. 11, and to complete the dumping operation by increasing the tilt in FIG. 1, as the hopper progressively empties. This is accomplished merely by moving the valve 180 to the position of FIGS. 13 and 14 after the hopper has been at a low condition of tilt until the hopper reaches an increased or maximum condition of tilt such as that shown in FIG. 1, whereupon the valve 180 can be restored to the neutral position of FIG. 12, or left in its active position. Stop limit carriage advance and hopper tilt, in the present example the pistons in the cylinders 140, 152 and 154 serve as such stops when they are fully extended.

After the hopper is emptied, the valve 180 is shifted to the left of the position of FIG. 12 instead of to the right as shown in FIG. 13. This reverses the functions of the main lines 184, 194. It now applies fluid under pressure from the inlet line 182 to the line 194. Under these conditions, fluid under pressure in the line 194 is directed by the branch line 196 to the retract side of the carriage cylinder 140 and to the upper ends of the tilt cylinders 152, 154. At first the pressure on the carriage cylinder 140 has no effect because as seen in FIGS. 11 and 14, the lockout cams 176 are in position to engage the extreme outer end of the associated track side rails 134, 136 and hence retraction of the carriage C cannot take place even though cylinder 140 is pressurized for that purpose. This prevents retraction of the carriage before the hopper H has been lowered from its tilted position.

However, the aforesaid pressure in the line 194 with the valve 180 in its retract (left) position is also on branch line 198 and sub-branches 198a, 198b. This directs pressure to the upper ends of the tilt cylinders 152, 154 and causes them to lower the hopper H to its bedded position in the carriage such as that shown in FIGS. 10 and 13. As the hopper reaches its lowered position in the carriage C, the hopper pins 174 re-enter the notch 173 in each fork 172 whereupon both lockout cams 176 are pivoted up to clear the ends of the track T. This position can be visualized in FIG. 10. Now the pressure previously applied by branch line 196 to the outer end of the carriage cylinder 140 will be effective to retract the carriage and hence this action takes place until the carriage C and hopper H are fully retracted back to the position of FIGS. 9 and 12. The lines 184–188 act as exhaust lines during hopper lowering and carriage retraction.

Having completed a detailed description of the present invention it can now be seen that there is provided a harvester or the like with a shelled product dumping mechanism that has several features and advantages. Although the functions of carriage shift and hopper tilt are performed by separate cylinders (140, 152, 154), by providing a mechanical interlock as described, these functions can all be controlled by a single valve. Also, by assigning the carriage and retract cylinder 140 the sole function of advance and retract in this carriage without requiring it to exert forces necessary to tilt a loaded hopper, binding of the parts during operation is prevented even through the hopper is unusually wide. For example, in the embodiment just described the hopper H is 4 feet wide and over 6 feet long and yet the carriage and a fully loaded hopper are readily advanced and retracted by the cylinder 140 without binding.

The mechanical interlock removes judgment on the part of the operator as to sequencing, because although it is a simple mechanism it prevents tilting of the hopper until the carriage has been fully extended and prevents retraction of the carriage until the hopper has been fully lowered.

In addition to the above features, a hopper door D is provided which is automatically opened and closed as the hopper is tilted and lowered. Furthermore, the degree of opening of the door is proportional to the degree of hopper tilt thereby providing control of product flow from the hopper during the dumping operation and making it possible to prevent possible damage to the product due to excessive fall thereof, excessive flow due to the hopper being full, or the like.

Although the best mode contemplated for carrying out the present invention has been herein shown and described, it will be apparent that modification and variation may be made without departing from what is regarded to be the subject matter of the invention.

I claim:

1. In an agricultural harvester of the type comprising a chassis, a threshing device, means for feeding crop to said threshing device, a laterally extending track on said chassis, a laterally shiftable hopper carriage on said track, a hopper pivotally mounted on a forward portion of said carriage, said hopper having a top-pivoted door, means for sliding said hopper carriage along the track, means for tilting the hopper on said carriage, means for opening the hopper door, and conveyor means for delivering threshed crop from said threshing device to said hopper; the improvement wherein said means for opening the door comprises link means connected between said door and the hopper carriage, said link means holding the door closed when the hopper is in its lowered position, said link means opening the door when the hopper is tilted.

2. The harvester of claim 1, comprising an arm connected to said door and projecting generally upwardly past the door pivot, said link means connecting to said arm.

3. The harvester of claim 1, wherein said link means is proportioned to progressively open the door as the hopper tilt is increased, for gating the flow of crop between the door and the hopper in proportion to hopper tilt.

4. The harvester of claim 1, wherein said means for sliding said carriage along the track and said means for tilting the hopper on said carriage comprise separate fluid cylinder assemblies.

5. The harvester of claim 4, comprising means for preventing tilting of said hopper on the carriate before the carriage has been shifted along said track to a hopper dumping position.

6. The harvester of claim 5, comprising means for preventing retraction of said carriage from the hopper dumping position while the hopper is tilted on the carriage.

7. In a harvester of the type comprising a chassis, a threshing device, means for feeding crop to said threshing device, a frame on said chassis mounting a laterally extending track, a laterally shiftable hopper carriage on said track, a hopper pivotally mounted on a forward portion of said carriage, said hopper having a pivoted door, means for sliding said hopper carriage along the track, means for tilting the hopper on said carriage, means for opening the hopper door, and conveyor means for delivering threshed crop from said threshing device to said hopper; the improvement comprising hold-back means on said carriage and normally engaging keeper means on said hopper for preventing tilting of said hopper until the carriage has been advanced to a predetermined dumping position on said track.

8. The harvester of claim 7, wherein tilting of said hopper causes hold-back means to confront stop means on said track for preventiang retraction of said carriage when said hopper is tilted, lowering of said hopper to its normal position retracting said hold-back means from the stop means on said track for accommodating carriage retraction.

9. The harvester of claim 7, wherein said hold-back means comprises a lever pivotably mounted on said carriage, a notch formed in said lever and opening toward the hopper pivot, said keeper comprising a pin on the hopper that is restrained by the upper sidewall of said lever notch when the hopper is in its lowered position provided the notched end of said lever is prevented from turning upwardly on its pivot, and means for preventing upward turning of said lever on its pivot comprising a lever extension in the form of a cam that rides along said track until the carriage has been advanced to a hopper dumping position but clears the track when the hopper carriage is in the hopper dumping position.

10. The harvester of claim 9, wherein said cam confronts stop means on said track when the hopper is tilted for preventing retraction of the carriage in the track until said hopper has been lowered to withdraw said cam from its position confronting said track stop means.

11. The harvester of claim 8, wherein said means for sliding the hopper carriage along the track comprises a double acting fluid cylinder assembly between the frame and the carriage, said means for tilting the hopper on the carriage comprising a pair of double acting fluid cylinder assemblies extending between the hopper and the carriage, and valve means for supplying fluid under pressure simultaneously to the carriage advance and hopper tilt ends of said cylinder assemblies, or simultaneously to the carriage retraction and hopper lowering ends of said cylinder assemblies.

12. In an agricultural harvester of the type comprising a chassis, a threshing device, means for feeding crop to said threshing device, a frame on said chassis mounting a laterally extending track, a laterally shiftable hopper carriage on said track, a hopper pivotally mounted on a forward portion of said carriage, said hopper having a pivoted door, means for sliding said hopper carriage along the track, means for tilting the hopper on said carriage, means for opening the hopper door, and conveyor means for delivering threshed crop from said threshing device to said hopper; the improvement wherein said means for sliding the carriage along said track comprises a single fluid cylinder assembly connected between said frame and the carriage and extending beneath and along the midplane of said hopper, said means for tilting the hopper on its carriage comprising a fluid cylinder assembly on each side of the hopper and connected between the hopper and the carriage, hold-back means for preventing tilting of the hopper before the carriage has been substantially fully advanced, and hold-back means for preventing retraction of said carriage before the tilted hopper has been returned to its normal, product receiving position on the carriage.

13. The harvester of claim 12, wherein said hold-back means comprises a mechanical interlock device on said carriage, keeper means on the hopper and stop means on the track, said interlock device having means for holding down said hopper keeper means until the carriage is fully advanced, said interlock device also having means for engaging said track stop means when the carriage is advanced for preventing carriage retraction until the hopper has been re-lowered to bring its keeper means into engagement with the interlock device on said carriage.

14. The harvester of claim 13, comprising valve means for supplying fluid under pressure to said cylinder assemblies, said valve means supplying fluid under pressure simultaneously to the carriage advance end of said carriage fluid cylinder assembly and to the hopper tilt ends of said hopper tilting fluid cylinder assemblies when said valve means is in one position, another position of said valve means simultaneously supplying fluid under pressure to the carriage retraction end of said carriage fluid cylinder assembly and to the hopper lowering ends of said hopper tilting fluid cylinder assemblies.

* * * * *

UNITED STATES PATENT OFFICE
CERTIFICATE OF CORRECTION

PATENT NO. : 3,771,531
DATED : November 13, 1973
INVENTOR(S) : FRANK F. SCRIBNER It is certified that error appears in the above-identified patent and that said Letters Patent are hereby corrected as shown below:

```
Column 1, line 14, delete "(SJ 5329)".
          line 18, delete "(SJ 5351)".

Column 4, line 31, after "Ser. No. 141,900" insert
                   -- , now Patent No. 3,709,231 --.

Column 5, line  7, change "track" to -- tracks --.
          line 39, change "53" to -- 52 --.

Column 8, line 25, change "provided" to -- pivoted --.

Column 12, line 8, change "carriate" to -- carriage --.
           line 31, after "causes" insert -- said --.
           line 32, change "preventiang" to -- preventing --.
```

Signed and sealed this 24th day of June 1975.

(SEAL)
Attest:

RUTH C. MASON
Attesting Officer

C. MARSHALL DANN
Commissioner of Patents
and Trademarks